United States Patent [19]

Pastor et al.

[11] Patent Number: 4,753,666
[45] Date of Patent: Jun. 28, 1988

[54] DISTILLATIVE PROCESSING OF $CO_2$ AND HYDROCARBONS FOR ENHANCED OIL RECOVERY

[75] Inventors: Gerald R. Pastor, Englewood; Janet F. Peters, Littleton; Wayne K. Larsen, Aurora; Al C. Iakovakis, Englewood, all of Colo.

[73] Assignee: Chevron Research Company, San Francisco, Calif.

[21] Appl. No.: 889,975

[22] Filed: Jul. 24, 1986

[51] Int. Cl.[4] .................................................. F25J 3/02
[52] U.S. Cl. ......................................... 62/24; 62/37; 62/54
[58] Field of Search .................. 62/9, 11, 23, 24, 27, 62/28, 54, 37

[56] References Cited

U.S. PATENT DOCUMENTS

| | | | |
|---|---|---|---|
| 3,983,711 | 10/1976 | Soloman | 62/28 |
| 4,185,978 | 1/1980 | McGalliard et al. | 62/23 |
| 4,235,613 | 11/1980 | Castoe | 62/24 |
| 4,293,322 | 10/1981 | Ryan et al. | 62/17 |
| 4,318,723 | 3/1982 | Holmes et al. | 62/20 |
| 4,350,511 | 9/1982 | Holmes et al. | 62/17 |
| 4,383,841 | 5/1983 | Ryan et al. | 62/17 |
| 4,383,842 | 5/1983 | Obrien | 62/20 |
| 4,417,449 | 11/1983 | Hogarty et al. | 62/22 |
| 4,428,759 | 1/1984 | Ryan et al. | 62/17 |
| 4,441,900 | 4/1984 | Swallow | 62/23 |
| 4,444,576 | 4/1984 | Ryan et al. | 62/20 |
| 4,547,209 | 10/1985 | Netzer | 62/17 |
| 4,563,202 | 1/1986 | Yoa et al. | 62/20 |

OTHER PUBLICATIONS

P. J. Persico et al., "Separation of CO EOR Associated Gas", Gas Conditioning Conference Mar. 5-7 1984.
"Texas EOR Project Proposed", Oil & Gas Journal (7/22/85).
B. C. Price, "Looking at $CO_2$ Recovery in Enhanced Oil Recovery Projects", Oil & Gas Journal (12/24/84).
J. E. Johnson et al.; "Gas Processing Needs for EOR", Hydrocarbon Processing (10/1985).

Primary Examiner—Ronald C. Capossela
Attorney, Agent, or Firm—S. R. LaPaglia; E. J. Keeling; V. A. Norviel

[57] ABSTRACT

A method of treating $CO_2$ rich gas for injection into a petroleum reservoir is described. $CO_2$ rich gas containing methane, nitrogen, ethane, propane, butanes, and heavier components is distilled such that substantially all of the heavier components are produced as a bottoms product and substantially all of the $CO_2$, ethane, and propane are produced as an overhead vapor. The presence of ethane and propane in the overhead vapors overcomes the effect of nitrogen and methane on minimum miscibility pressure in the reservoir, and the problems created by $CO_2$ freezing and the $CO_2$/ethane azeotrope are avoided, furthermore, a readily marketable liquid product is produced.

15 Claims, 2 Drawing Sheets

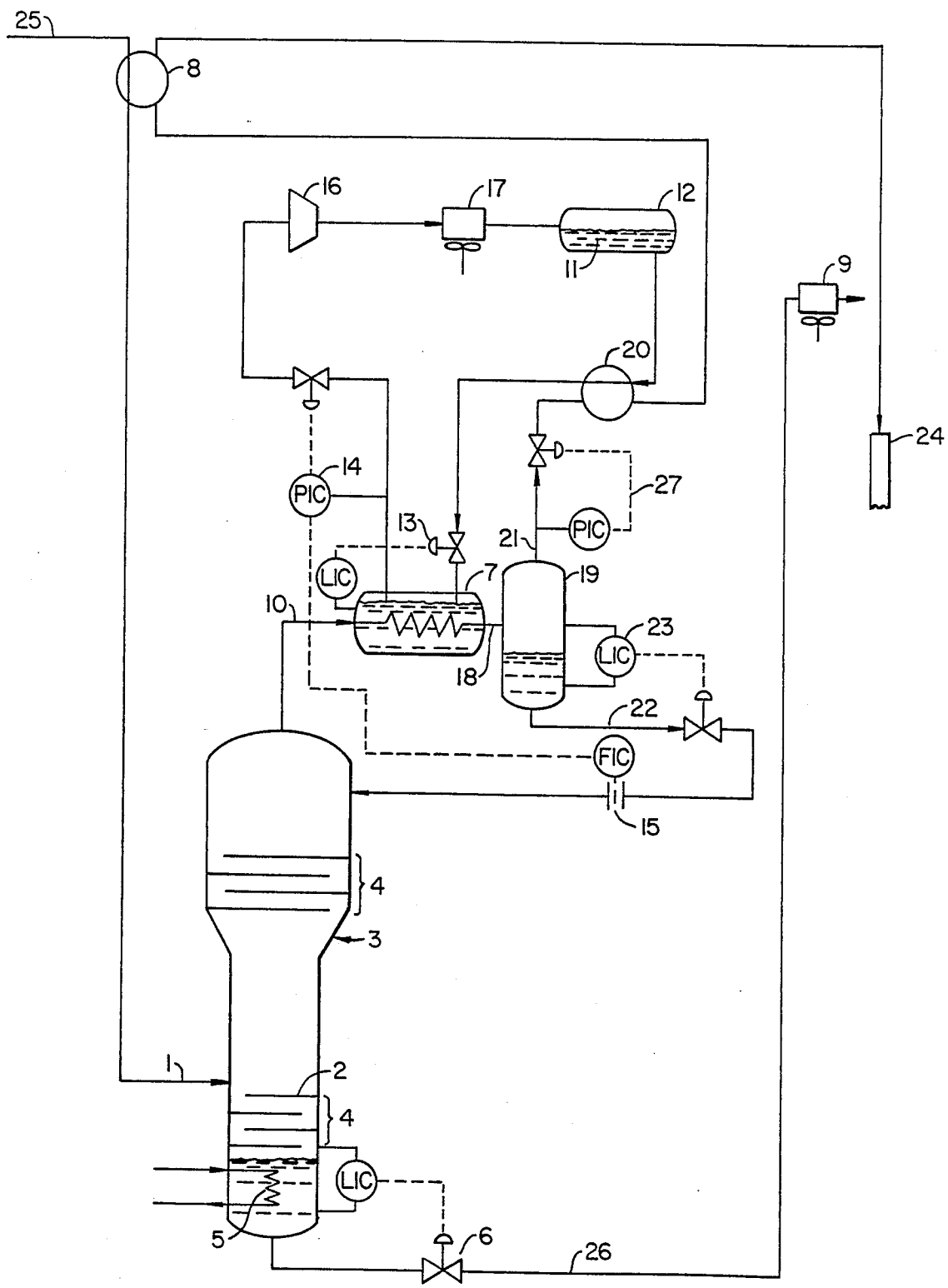
FIG.—1.

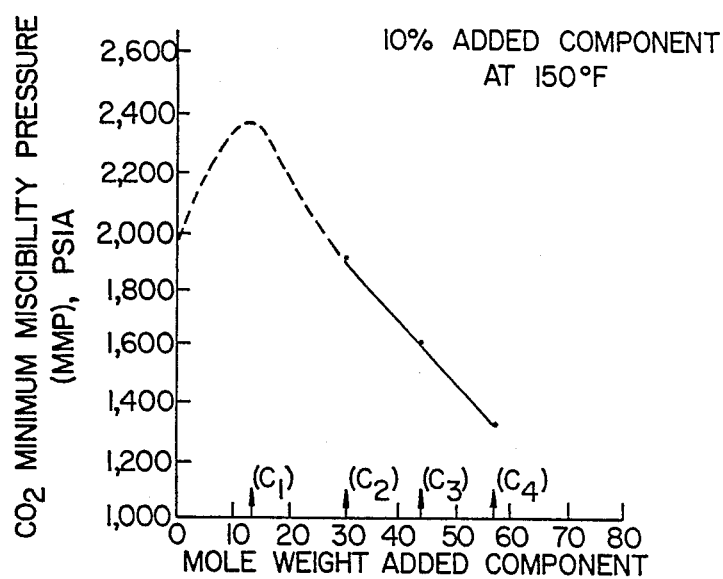
FIG._2.
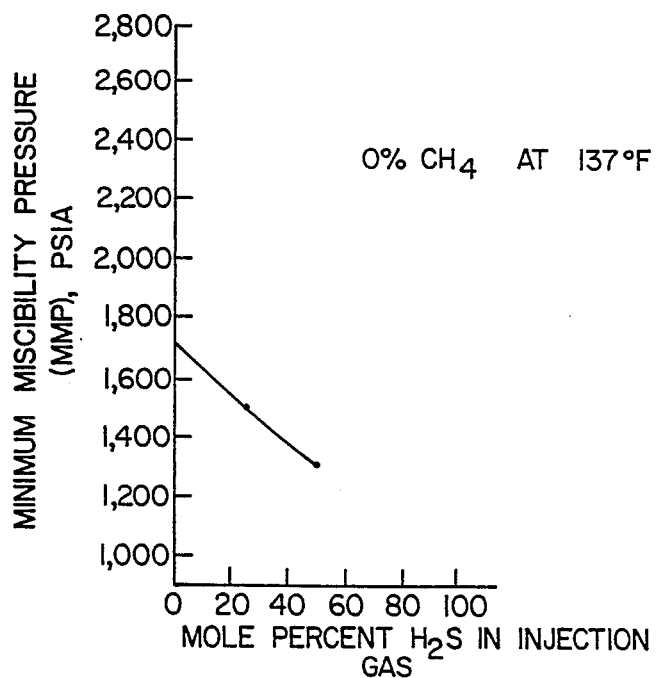
FIG._3.
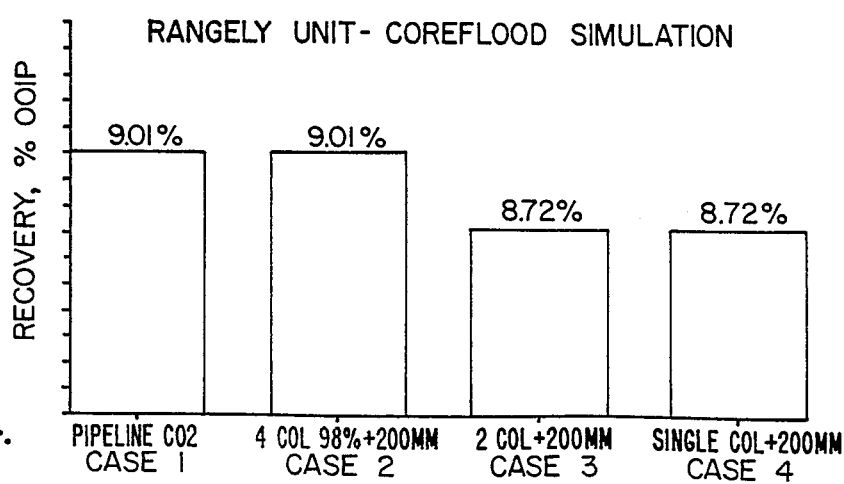
FIG._4.

4,753,666

DISTILLATIVE PROCESSING OF $CO_2$ AND HYDROCARBONS FOR ENHANCED OIL RECOVERY

FIELD OF THE INVENTION

This invention relates generally to an improved method for enhanced oil recovery. More specifically the invention provides an improved method for treating $CO_2$ rich gas streams for injection into oil-bearing formations.

BACKGROUND OF THE INVENTION

It is well known that only a small fraction of the original oil in place in a petroleum reservoir can be recovered with so called "primary" and "secondary" production methods. Various "tertiary" methods of increasing the recovery of oil contained in oil-bearing rocks have been devised. Among these tertiary recovery techniques is the method of injecting a miscible compound into the reservoir. The most common miscible compound used is carbon dioxide ($CO_2$).

In the initial stages of a $CO_2$ flood, $CO_2$ gas is commonly purchased from a large $CO_2$ distribution pipeline. The price of gas purchased from these pipelines is presently in the range of $1.00 to $1.50 per thousand standard cubic feet (MSCF).

After injecting $CO_2$ into the reservoir for a period of time, associated gas production will contain increasingly high percentages of $CO_2$ due to breakthrough of the injected $CO_2$ gas. It is often economical to recycle this gas into the petroleum reservoir. However, this recycled gas commonly has several undesirable components contained in it and it must be processed before reinjection. The primary constituents that must be considered in processing of this gas are methane ($CH_4$) and nitrogen ($N_2$) because these gases will dramatically reduce the miscibility of the injected gas. Other components that should be considered are heavier hydrocarbons (because of both their economic value as separate products and because of their ability to offset the miscibility problems created by $CH_4$ and $N_2$), $H_2S$ (because of safety concerns and sales specifications), and water (because of hydrate problems).

Extensive efforts have been devoted to developing an economical method for treating these gas streams and a large number of process schemes have been devised.

Chemical solvents (such as amines) have been considered for removal of $CO_2$ from the hydrocarbon components. Use of these solvents becomes impractical in gas streams containing high concentrations of $CO_2$ because of the large energy demand of amine reboilers and other equipment. Further, the $CO_2$ is saturated with water in amine plants and this can create hydrate and corrosion problems downstream.

Distillation of $CO_2$ from methane has also been considered. The relative volatility of methane and $CO_2$ is very high and this distillation is in theory quite easy. However, the process must operate at relatively high pressure and low temperature and, therefore, the possibility of a solid carbon dioxide phase coexisting with vapor/liquid $CO_2/CH_4$ mixture is high. Solutions to this problem have been proposed in U.S. Pat. Nos. 4,318,723, 4,293,322 et al. in which an additive (generally natural gasoline recycled from elsewhere in the plant) is introduced into the feed. This prevents $CO_2$ freezing and also aids in breaking an ethane/$CO_2$ azeotrope. These processes have several inherent disadvantages, however. Initially, these processes are extremely expensive from both a capital and operating perspective since it is necessary to provide multiple distillation columns and massive refrigeration capacity to cool the entire inlet gas stream to $-40°$ F. or colder. For example, in the example labeled "Table II" in U.S. Pat. No. 4,318,723, the feed temperature is reduced to $-65°$ F. This also results in the need to use exotic materials of construction for the process equipment.

Further, the process produces sour, high vapor pressure liquid streams that must be subjected to additional processing before sale. Further, the ultimate value of the liquid products is offset by the need to purchase additional $CO_2$ as a result of the lost gas volume, i.e., there is significant shrinkage associated with the process.

Simpler techniques for treating hydrocarbon rich $CO_2$ streams have also been proposed in broad conceptual terms. For example, in "Looking at $CO_2$ Recovery in Enhanced-Oil-Recovery Projects," *Oil and Gas Journal*, Dec. 24, 1984, the authors show a "Straight Refrigeration" process for separating hydrocarbons from $CO_2$. However, this process also has several inherent disadvantages. Initially, as with the processes described in the above-mentioned patents, the inlet gas stream must be cooled to $-40°$ F. or colder for recovery of $C_3+$, requiring extremely high refrigeration capacity. Further, the liquid stream produced by this process would require further treatment before sale since it will have a high vapor pressure (approximately 40 psia RVP) as well as unacceptable $CO_2$ and $H_2S$ concentrations. Finally, a large portion of the $C_4+$ would go overhead and be unnecessarily wasted since no rectification section is provided on the column.

In summary, it is desirable to create a process that recognizes the ability of ethane, propane and butane to overcome the negative effects of nitrogen and methane on the miscibility of $CO_2$ injection gas. It is further desirable to create a process that produces both acceptable $CO_2$ injection gas and saleable liquid products. It is further desirable to create a process that treats $CO_2$ injection gas is an economical manner from both a capital investment and operating expense perspective. It is further desirable to create a process that does not require elaborate processing to overcome the $CO_2/C_2H_6$ azeotrope or to avoid $CO_2$ solid formation. It is further desirable to create a process which minimizes the shrinkage of the $CO_2$ injection gas.

BRIEF SUMMARY OF THE INVENTION

Accordingly, the present invention provides a method and apparatus for treating hydrocarbon rich $CO_2$ gas streams for injection into oil-bearing formations in an effective and economical manner. A hydrocarbon rich $CO_2$ gas stream is compressed to approximately 350 psia. The gas enters a multi-tray distillation column at an intermediate tray. Overhead vapor from the column is cooled in an overhead condenser to approximately $-20°$ to $0°$ F. with propane refrigerant to produce a two-phase stream. The two-phase stream is separated into a liquid and a vapor (product) stream in a reflux drum. Vapor from the reflux drum is further compressed for injection into an oil-bearing formation. Liquid from the reflux drum is returned to the top tray of the column as reflux.

A reboiler on the bottom of the column maintains the bottom temperature at approximately $360°$ F. An NGL bottoms product consisting of a large fraction of the $C_4+$ in the inlet stream is removed from the column, cooled, and sold.

Most of the $C_2$ and $C_3$ and a significant fraction of the $C_4$ go overhead with the $CO_2$ injection gas. By leaving the $C_2$, $C_3$, and a portion of the $C_4$ (mostly isobutane) in the $CO_2$, the negative effects of $C_1$ on the miscibility of the $CO_2$ injection gas are overcome. The recovery of $C_3/C_4$ can be monitored to control the miscibility of the $CO_2$ injection gas and optimize the economical operation of the plant.

$H_2S$ is concentrated in the overhead gas. $H_2S$ is known to enhance the miscibility of injection gas. Furthermore, $H_2S$ would have to be removed from a liquid product requiring expensive processing equipment.

The process produces a $CO_2$ gas stream with a relatively low minimum miscibility pressure with a minimum capital investment since only one distillation column, and only a fraction of the refrigeration capacity needed in other processes is necessary. The use of exotic materials of construction is also minimized because of the higher plant operating temperature and lower operating pressures. Further, since the distillation split takes place at the temperatures and pressures necessary to make a split at the $C_4$ level, the $CO_2/C_2$ azeotrope and $CO_2$ solid formation are not problems. Shrinkage is also minimized because most of the $C_1$ to $C_3$ remains in the $CO_2$ gas product.

DESCRIPTION OF THE DRAWINGS

FIG. 1 is a schematic flow diagram showing the distillative apparatus for carrying out the invention described herein. (PIC=Pressure Indicating Controller, FIC=Flow Indicating Controller, and LIC=Level Indicating Controller.)

FIG. 2 is a graph showing minimum miscibility pressure versus the molecular weight of an added component for a selected crude oil.

FIG. 3 is a graph showing the minimum miscibility pressure versus mole percent $H_2S$ for injection gas.

FIG. 4 is a bar graph showing the percentage of original oil in place recovered using the present invention and various prior art devices.

DETAILED DESCRIPTION OF THE INVENTION

The present invention provides a method for economically treating hydrocarbon rich $CO_2$ gas for injection into an oil-bearing formation utilizing the steps of introducing a feed stream into distillation equipment. The feed stream may contain a mixture of carbon dioxide, methane, ethane, propane, butanes, and heavier hydrocarbons. The feed stream is distilled in the distillation equipment to produce an overhead stream and a bottoms stream. The overhead stream contains substantially all of the carbon dioxide, methane, ethane and propane, and the bottoms stream contains substantially all of said heavier hydrocarbons. The overhead stream is then injected into a hydrocarbon bearing formation.

Referring to FIG. 1, in the preferred embodiment of the invention, a $CO_2$ gas stream 25 containing a substantial percentage of hydrocarbons and potentially containing hydrogen sulfide, nitrogen, mercaptans and other trace components is cross-exchanged in heat exchanger 8 with the column overhead product 21 and flows onto the feed tray 2 of a distillation column 3 containing a plurality of vapor/liquid contacting devices 4 such as bubble cap trays, sieve trays or packing.

In the preferred embodiment of the invention, the feed 1 enters the column at approximately 350 psia and 90° F. Other temperatures and pressures may be chosen. For example, lower feed temperatures may be desirable in some cases. 90° F. is chosen as being easy to achieve with an air cooler that may be located upstream of the process and feed/product heat exchanger 8.

In the preferred embodiment, the rectification portion of the column 3 is a larger diameter than the stripping section, as shown in FIG. 1. This feature is desirable because large vapor loadings will be present in the upper portion of the column.

The bottom portion of the column is equipped with a reboiler 5 that supplies heat to the column via hot oil or steam. The reboiler is equipped with temperature control equipment that maintains the temperature of the bottoms at approximately 360° F. in the preferred embodiment. The bottom of the column is also equipped with level control equipment 6 which maintains the liquid level at a point above the reboiler but sufficiently below the first tray. The bottoms product 26 flows from the bottom of the column to a bottoms air cooler 9 to be cooled to approximately ambient temperature for sale or blending with crude oil.

The overhead vapors 10 flow to an overhead condenser 7 which cools and partially condenses the overhead vapors. In the preferred embodiment, propane is used as a refrigerant. Other refrigerants could be used, as would be readily obvious to one skilled in the art (for example, ammonia). Liquid propane 11 is supplied from a propane surge drum 12. A level control system 13 maintains the level of propane above tubes in the overhead condenser. The pressure in the overhead condenser is maintained with a pressure control system 14 which, in the preferred embodiment, has its pressure set-point determined by a reflux flow measuring device 15. This control system enables the operator to maintain a fixed quantity of reflux to the column.

Propane vapors from the overhead condenser are compressed in a compressor 16, condensed in a propane condenser 17, and returned to the propane surge drum 12. A propane subcooler 20 may also be desirable to increase the energy efficiency of the process.

The two-phase mixture 18 flowing from the overhead condenser is separated in a reflux drum 19. The two-phase mixture is separated into an overhead product stream 21 and a reflux stream 22. A level control system 23 maintains a constant amount of liquid in the reflux drum, and is opened to allow liquid to flow into the column.

The pressure at which the distillation equipment operates is controlled by pressure control equipment 27. The product vapor stream flows from the reflux drum to the propane/overhead subcooler 20 and then to the overhead/feed heat exchanger 8. The overhead product stream is further compressed in a compressor (not shown) and sent to injection wells 24.

To illustrate the operation of the above described process, the program PROCESS TM (*Simulation Sciences Inc.*, Version 1.01, 1985) was used to simulate the operation of the process on a typical $CO_2$/hydrocarbon gas stream. The results of the simulation are illustrated in Table I:

TABLE I

Summary of PROCESS ™ Simulation
of the Present Invention on a
Typical $CO_2$/Hydrocarbon Stream

| | |
|---|---|
| No. of Ideal Trays in Column | 20 |
| Feed Point Tray | 7 |
| Gas Feed Rate | 110 MMSCF |
| Reflux Drum Pressure | 350 psia |
| Column Differential Pressure | 5 psia |
| Condenser Duty | 17 MM BTU/Hour |
| Reboiler Duty | 8 MM BTU/Hour |
| Reflux Temperature | 1.2° F. |
| Bottoms Temperature | 360° F. |

| | Stream Name | | |
|---|---|---|---|
| | Feed | Overhead Product | Bottoms Product |
| Rate | 110 MMSCF | 107 MMSCF | 2620 BPD |
| $H_2S$ (ppmv) | 500 | 514 | — |
| | Mole Percent | | |
| $N_2$ | 3.4 | 3.5 | — |
| $CO_2$ | 83.9 | 86.3 | — |
| $C_1$ | 6.6 | 6.9 | — |
| $C_2$ | 1.4 | 1.4 | — |
| $C_3$ | 1.1 | 1.1 | 0.02 |
| $iC_4$ | 0.5 | 0.4 | 3.1 |
| $nC_4$ | 0.7 | 0.3 | 16.7 |
| $iC_5$ | 0.4 | 0.001 | 16.0 |
| $nC_5$ | 0.6 | — | 23.3 |
| $C_6$ | 0.6 | — | 24.4 |
| $C_7+$ | 0.4 | — | 16.4 |

As can be seen, operation of the process in the above-described manner results in a separation in which essentially all of the propane and ethane go into the overhead stream while most of the butane and essentially all of the pentane and heavier components are present in the bottoms stream.

Although the invention has been illustrated with regard to the above example, a range of operating pressures and temperatures might be selected to make the above described separation. The optimum range of the major process variables are described in Table II:

TABLE II

Optimum Process Variables

| | |
|---|---|
| Column Pressure | 150 to 400 psia |
| Overhead Condenser Temperature | −40 to 20° F. |
| Reboiler Temperature | 225 to 400° F. |
| Reflux Ratio | 0.21 to 0.30 |
| Number of Trays | 22 to 40 |
| Number of Trays above Feed Point | 10 to 20 |
| Number of Trays Below Feed Point | 15 to 25 |

An important advantage of the above described process is that the negative effects of methane and nitrogen on the miscibility of the injection gas are largely overcome with the presence of ethane, propane and butane, and the process does not require elaborate process steps to avoid $CO_2$ freezing and/or to overcome the $CO_2$/Ethane azeotrope.

FIGS. 2 and 3 (adapted from "Miscible Displacement", F. I. Stalkup, Society of Petroleum Engineers of AIME, 1983, pages 141 and 140, respectively), and 4 generally illustrate the effect of distilling the $CO_2$ injection gas in the described method. FIG. 2 shows the effect of various alkyl hydrocarbons on $CO_2$ miscibility at 150° F. when 10% of the alkyl hydrocarbon is added to $CO_2$. As shown in FIG. 2, methane has a negative effect, i.e. the miscibility pressure is increased. By contrast, the presence of ethane, propane and butane is a positive one, i.e. the minimum miscibility pressure is decreased below that of pure $CO_2$. Similarly, the presence of $H_2S$ is positive, as illustrated in FIG. 3. As the percentage of $H_2S$ in the gas increases, the minimum miscibility pressure decreases, regardless of the concentration of methane present.

The present invention takes full advantage of these effects. Unlike prior art processes, methane is left in the overhead gas, thereby overcoming the many problems associated with methane/$CO_2$ distillation discussed above. To offset the effect of methane or minimum miscibility pressure, $H_2S$, ethane, propane, and a portion of the butane remain in the overhead gas. Further, an easily saleable liquid product is produced.

To further illustrate this advantage, various reservoir simulations were performed to determine the effect of various process schemes on the ultimate recovery of oil in a petroleum reservoir in Rangely, Colo., using a miscible flood reservoir simulation program of the type familiar to one skilled in the art. The program was run assuming the following:

Case 1 It was assumed that "pipeline quality" (99.3%) $CO_2$ was purchased and used exclusively for injection. Produced gas would be flared or otherwise disposed of in this case.

Case 2 It was assumed that a "Four Column Ryan-Holmes Plant" similar to that described in FIG. 13 of "Looking at $CO_2$ Recovery in Enhanced Oil Recovery Projects" was used to treat produced gas and that the $CO_2$ product from this plant was injected along with 200 MMSCF of pipeline quality gas.

Case 3 It was assumed that a "Two Column Ryan-Holmes Plant" similar to that described in FIG. 12 of "Looking at $CO_2$ Recovery in Enhanced Oil Recovery Projects" was used to treat produced gas and that the $CO_2$ product from this plant was injected along with 200 MMSCF of pipeline quality gas.

Case 4 It was assumed that a 1 column plant as described in the present invention was used to treat produced gas and that the $CO_2$ product from this plant was injected along with 200 MMSCF of pipeline quality gas.

The results of those reservoir simulations are shown in FIG. 4. As would be expected in Case 1, the pure pipeline quality gas recovers the greatest percentage of the original oil in place. The elaborate 4 column Ryan-Holmes plant in Case 2 achieves essentially the same results as Case 1 since the gas is processed to almost pipeline quality.

It is seen in Case 4 that the simpler 1 column plant described in the present invention achieves essentially the same results as the more complex 2 column Ryan-Holmes plant used in Case 3. However, the present invention has the advantages of having a lower capital cost lower refrigeration requirements, and lower overall operating costs. Similarly, the plant described in Case 4, while achieving a lower percentage recovery of original oil in place than Case 2, would have dramatically lower capital and operating costs than the 4-Column Ryan-Holmes plant used in Case 2. These lower costs could (in many situations) result in better overall economics.

It is intended that the above description be illustrative and not restrictive. Variations on the above process will be readily apparent to those skilled in the art. The scope of the invention should, therefore be limited not to the above description but by the appended claims.

What is claimed is:

1. A method for treating hydrocarbon rich $CO_2$ gas for injection into an oil-bearing formation comprising the steps of:
   (a) introducing a feed stream into distillation equipment, said feed stream comprising a mixture of carbon dioxide, methane, ethane, propane, butanes, and heavier hydrocarbons;
   (b) distilling said feed stream with said distillation equipment to produce an overhead stream and a bottoms stream, said overhead stream containing substantially all of said carbon dioxide, methane, ethane and propane, and said bottoms stream containing substantially all of said heavier hydrocarbons; and
   (c) injecting said overhead stream into a hydrocarbon bearing formation.

2. A method for treating a gas stream, containing carbon dioxide, methane, ethane, propane, butane, and heavier hydrocarbons for reinjection into an oil-bearing formation comprising the steps of:
   (a) introducing the gas stream into a distillation column at a feed tray, said distillation column containing a plurality of vapor/liquid contacting devices, said feed tray below a rectification section and above a stripping section;
   (b) operating said distillation column to produce an overhead stream containing substantially all of said carbon dioxide, methane, ethane and propane, and a bottoms stream containing substantially all of said heavier hydrocarbons, and;
   (c) injecting said overhead stream into an oil-bearing formation.

3. A method for treating hydrocarbon-rich $CO_2$ gas containing carbon dioxide, methane, ethane, propane, butane, and heavier hydrocarbons for injection into an oil-bearing formation in an economical manner comprising the steps of:
   (a) introducing said hydrocarbon-rich gas stream into a multi-tray distillation column at an intermediate tray;
   (b) cooling an overhead vapor from said distillation column in a partial condenser to produce a two-phase stream;
   (c) separating said two-phase stream in a reflux drum to produce a reflux stream and a product stream;
   (d) introducing said reflux stream onto a top tray of said distillation column;
   (e) reboiling said distillation column with a reboiler;
   (f) injecting said product stream into a hydrocarbon-bearing formation; and
   (g) said steps of introducing said gas stream into a distillation column, chilling, separating, introducing said reflux stream onto a top tray of said distillation column, and reboiling carried out under conditions which most of said methane, ethane, and propane are contained in said product stream.

4. The method of claim 2 wherein said step of operating said distillation column further comprises the step of cooling an overhead stream in a partial condenser.

5. The method of claim 2 wherein said step of operating said distillation column further comprises the step of reboiling a bottoms stream in a reboiler.

6. The method of claim 1 wherein said distillation equipment further comprises a distillation column, a condenser, and a reboiler.

7. The method of claim 2, 3 or 6 wherein said distillation column operates in a range of pressures from 150 to 400 psia.

8. The method of claim 3, 4 or 6 wherein said condenser operates in the temperature range from $-40°$ F. to $20°$ F.

9. The method of claim 3, 4 or 6 wherein said reboiler operates in the temperature range from $225°$ F. to $400°$ F.

10. The method of claim 3, 4 or 6 wherein said condenser is cooled with a propane refrigerant.

11. The method of claim 3, 4 or 6 wherein said condenser is cooled with an ammonia refrigerant.

12. The method of claim 10 further comprising the step of setting a pressure of said propane refrigerant based on a reflux flow rate.

13. The method of claim 12 further comprising the step of warming said overhead gas with said propane.

14. The method of claim 13 further comprising the step of cooling said feed stream with said overhead stream.

15. A method for treating hydrocarbon-rich $CO_2$ gas for injection into an oil-bearing formation consisting essentially of the steps of:
   (a) introducing a feed stream into distillation equipment, said feed stream comprising a mixture of carbon dioxide, methane, ethane, propane, butanes, and heavier hydrocarbons;
   (b) distilling said feed stream with said distillation equipment to produce an overhead stream and a bottoms stream, said overhead stream containing substantially all of said carbon dioxide, methane, ethane and propane, and said bottoms stream containing substantially all of said heavier hydrocarbons; and
   (c) injecting said overhead stream into a hydrocarbon-bearing formation.

* * * * *